United States Patent [19]

Ide

[11] Patent Number: 5,982,739

[45] Date of Patent: Nov. 9, 1999

[54] OPTICAL DATA RECORDING APPARATUS PRODUCING A LASER BEAM HAVING A DIAMETER LARGER THAN OPTICAL MEDIA GROOVE WIDTH

[75] Inventor: Tatsunori Ide, Tokyo, Japan

[73] Assignee: NEC Corporation, Tokyo, Japan

[21] Appl. No.: 08/325,104

[22] Filed: Oct. 17, 1994

Related U.S. Application Data

[62] Division of application No. 07/982,667, Nov. 25, 1992, abandoned.

[30] Foreign Application Priority Data

Nov. 29, 1991 [JP] Japan .................................. 3-316084

[51] Int. Cl.⁶ ...................................................... G11B 7/24
[52] U.S. Cl. ...................................................... 369/275.4
[58] Field of Search ........................... 369/13, 14, 275.4, 369/275.3, 116, 110; 360/59, 114; 365/122; 428/694 ML, 64; 430/64, 119

[56] References Cited

U.S. PATENT DOCUMENTS

| | | | |
|---|---|---|---|
| 4,403,318 | 9/1983 | Nagashima et al. | 369/116 |
| 4,953,150 | 8/1990 | Sonobe | 369/116 |
| 5,038,338 | 8/1991 | Terao et al. | 369/116 |
| 5,040,165 | 8/1991 | Taii et al. | 369/116 |
| 5,075,147 | 12/1991 | Usami et al. | 430/64 |
| 5,171,618 | 12/1992 | Suzuki | 428/64 |
| 5,194,363 | 3/1993 | Yoshioka et al. | 430/291 |
| 5,221,588 | 6/1993 | Morimoto et al. | 430/19 |
| 5,383,176 | 1/1995 | Inui et al. | 369/275.4 |
| 5,432,774 | 7/1995 | Fukumoto et al. | 369/275.3 |

OTHER PUBLICATIONS

Erasable Compact Disk Using Phase Change Optical Media, Ohno et al, Technical Diggest Of Meeting On Optical Data Storage, TUA3, 1991.

Japanese Patent Abstract 3–241530 (A), vol. 16, No. 32 (P–1303), Oct. 28, 1991.

Japanese Patent Abstract 61–156532 (A), vol. 10, No. 361 (P–523), Jul. 16, 1986.

Primary Examiner—Tan Dinh
Attorney, Agent, or Firm—Foley & Lardner

[57] ABSTRACT

In an optical data recording media provided with a recording layer which changes its optical characteristics by the difference of heat history of heating and cooling by the irradiation of the laser light to a transparent substrate on which tracking channels have been formed. The width of an extruded or concave region formed by the tracking channels on the substrate is narrower than the diameter of the laser beam being used for recording, erasing and reading. Thereby, a problem which is associated with the recording frequency-dependent erasing efficiency in a case where the pulse width modulation method is used as the modulation method, can be solved.

9 Claims, 4 Drawing Sheets

OPTICAL DATA RECORDING APPARATUS PRODUCING A LASER BEAM HAVING A DIAMETER LARGER THAN OPTICAL MEDIA GROOVE WIDTH

This application is a division, of application Ser. No. 07/982,667, filed Nov. 25, 1992 and now abandoned.

BACKGROUND OF THE INVENTION

This invention relates to an optical data recording media which is provided with a recording layer of which optical characteristics are changed by the difference of heat history of heating by the irradiation of the laser light and cooling, and records, erases and reads data by the irradiation of the laser light to this recording layer.

An optical disk which records and reads data by utilizing the laser beam is worthwhile to draw attention as a file memory which has a large storage capacity and is portable. As this type of optical disks, read-only optical disk, write-once optical disk and rewritable disk (overwritable) have already been commercialized. Among these optical disks, phase change optical disk, exchange coupled overwritable disk and magnetic field modulation optical disk are known as the overwritable system.

In the phase change optical disk, data can be recorded or erased by utilizing the property of recording layer that locally changes the optical characteristics by the difference of heat history, when that part of the recording layer which is irradiated by the laser beam receives the heat history of heating by the irradiation of the laser beam and cooling of the recording layer. That is, in this phase change optical disk, the energy of irradiation light is modulated between the powers corresponding to two optically distinguishable states. Thereby, data can be recorded or new data can be overwritten over old ones. In this case, the high power energy of irradiating light is referred as the recording power and the low power energy as the erase power.

Also, as the method for aligning the new data to be recorded and the recording mark on the recording media, i.e., the modulation method, there is a pulse position modulation method in which data is aligned with the position of recording mark and the pulse width modulation method in which data is aligned with the length of recording mark. It is known that the pulse width modulation method is superior to the pulse position modulation method in containing a higher recording density.

Now, these optical data recording media are generally formed on a transparent substrate on which tracking grooves have been formed (Erasable Compact Disc Using Phase Change Optical Media; Technical Digest of Topical Meeting on Optical Data Strage TuA3-1-4 (February, 1991). FIG. 1 shows a conventional optical data recording media of this type. The tracking grooves 2 are formed on a transparent substrate 1 and a recording layer 3 is formed on the substrate 1. This recording layer 3 changes its optical characteristics depending on the difference of the heat history of heating by the irradiation of the laser light and cooling. And, the laser light 4 is irradiated to the area of the recording layer 3 between the tracking grooves 2, i.e., the area extruding upwards between the tracking grooves 2. In the conventional optical data recording media, the tracking grooves 2 are generally formed a V-shape, and in most case the width of the region extruded upwards between the tracking grooves 2 is wider than that of the concave region of the tracking groove 2.

However, in a case where the pulse width modulation method is used as the modulation method in the optical data recording media in which the recording layer 3 is formed on the substrate 1 provided with the V-shaped tracking grooves 2 with a wider extruded region between the tracking grooves 2, there is a problem in that the erase ratio largely depends on the frequency of recording laser output. That is, if it is intended to overwrite a shorter recording mark by a high frequency on the area where a longer recording mark has been formed by a low frequency, there is a problem that the erase ratio is lower than that of the opposite case and it is difficult to record signals using the pulse width modulation method. One of the causes creating such problem is that the width of the longer recording mark formed by the low frequency is wider than that of the recording mark formed by the high frequency. That is, in a case where the narrower recording mark by the high frequency is overwritten on the area of recording mark formed by the low frequency, an unerased area remains on the edge of broader recording mark formed by the low frequency, therefore, a high erase ratio can not be obtained.

SUMMARY OF INVENTION

An object of the present invention is to provide an optical data recording media which make possible the recording of signals using the pulse width modulation method as the modulation method and the increasing of the storage capacity of the recording layer which changes in its optical characteristics by the difference of heat history of heating by the irradiation of the laser light and cooling, and the method for optically recording and erasing the data on the recording media.

The optical data recording media wherein data are recorded on the media by laser beam according to the present invention has a transparent substrate and a recording layer provided on the transparent substrate. The transparent substrate has tracking grooves which form extruded regions or concave regions, the width of which are narrower than the diameter of laser beam. The recording layer changes its optical characteristics by the difference of the heat history of heating by the irradiation of the laser beam and cooling. Data are recorded by the irradiation of the laser beam on the extruded or concave region which is narrower than the diameter of the laser beam.

A method for optically recording and erasing data on the recording media according to the present invention, records and erases data using the irradiation of the laser beam to the recording layer provided on the transparent substrate with the tracking grooves which forms an extruded regions or concave regions, the width of the extruded or concave region on said substrate being narrower than the diameter of the laser beam used for recording and erasing data. In this method, these signals are recorded with coordinated to the length of the recording marks formed on the recording layer. The method comprises the step of recording or erasing data on the extruded or concave region of the recording layer, which is narrower than the diameter of said laser beam.

In the present invention, because the extruded or concave region which is formed by the tracking channels on the substrate and the recording layer is made narrower than the diameter of the laser beam, the width of the recording mark is restricted within the width of the narrow extruded or concave region so that the dependency of the width of the recording mark on the recording frequency can be reduced, and good erase ratio can be obtained even though a data is overwritten with a high frequency on the data recorded with a low frequency. Therefore, it is possible to record the signals in the phase change optical disk by the pulse width modulation method and to increase the recording memory of the optical disk.

DETAILED DESCRIPTION OF THE PREFERRED EMBODIMENTS

Figure 2A:
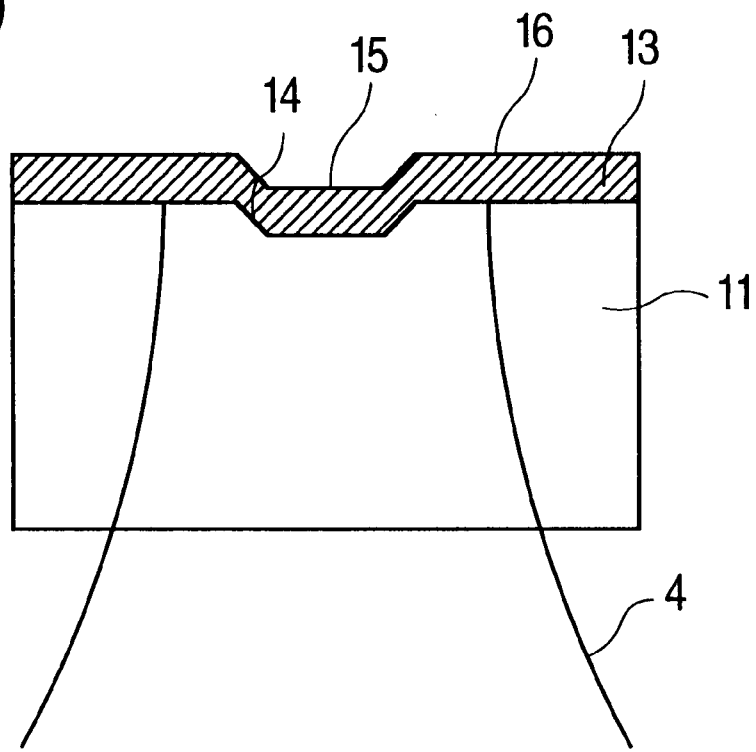
FIGS. 2(a) and (b) are sectional views showing the basic structure of the optical data recording media of this invention.

As shown in FIG. 2(a), in the optical data recording media according to an embodiment of this invention, tracking grooves 14 are formed on the surface of a transparent substrate 11. A recording layer 13 is formed on the whole surface of the substrate 11 including the tracking grooves 14. A concave region 15 or extruded region 16 is formed on both surfaces of the substrate 11 and the recording layer 13 by the tracking grooves 14 on the surface of the substrate 11.

In this FIG. 2(a), the width of concave region 15 formed by the grooves 14 is narrower than that of the extruded region 16 and smaller than the diameter of the laser beam 4 used for recording or erasing data.

Figure 2B:
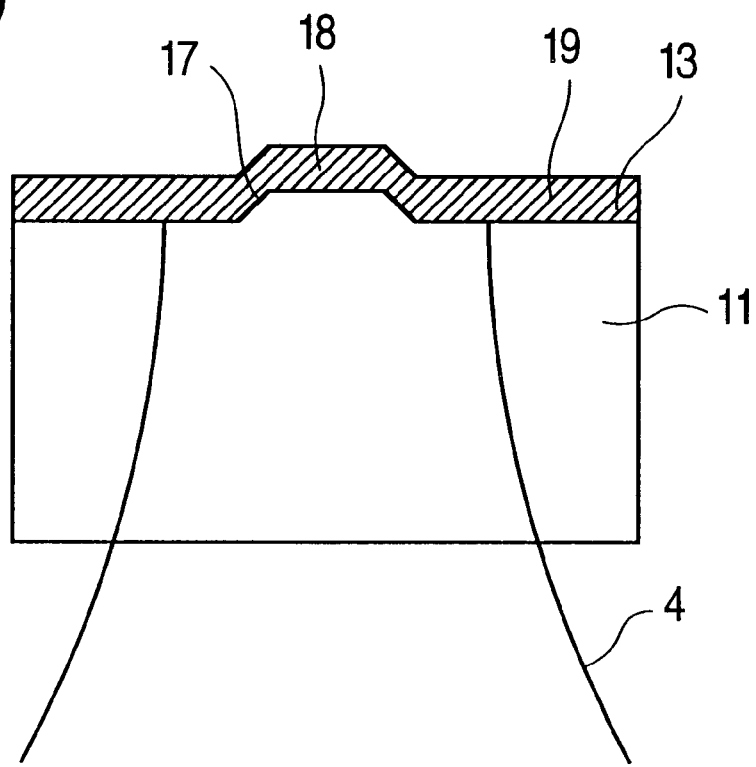

Also, in the optical data recording media shown in FIG. 2(b), tracking grooves 17 are formed on the surface of a transparent substrate 11. On the surface of substrate 11, an extruded region 18 and concave region 19 are formed by this tracking grooves 17. In the recording media, the width of extruded region 18 is narrower than that of the concave region 19. Also, the width of extruded region 18 is smaller than the diameter of the laser beam 4 used for erasing data.

As the recording layer 13, any material which changes its optical characteristics by the difference of the heat history of heating by the irradiation of the laser light 4 and cooling, compounds containing chalcogens such as Se, Te and the like for example, can be used. The thickness of the recording layer 13 may be 10 to 100 nm. It is preferably about 20 nm.

Figure 3:
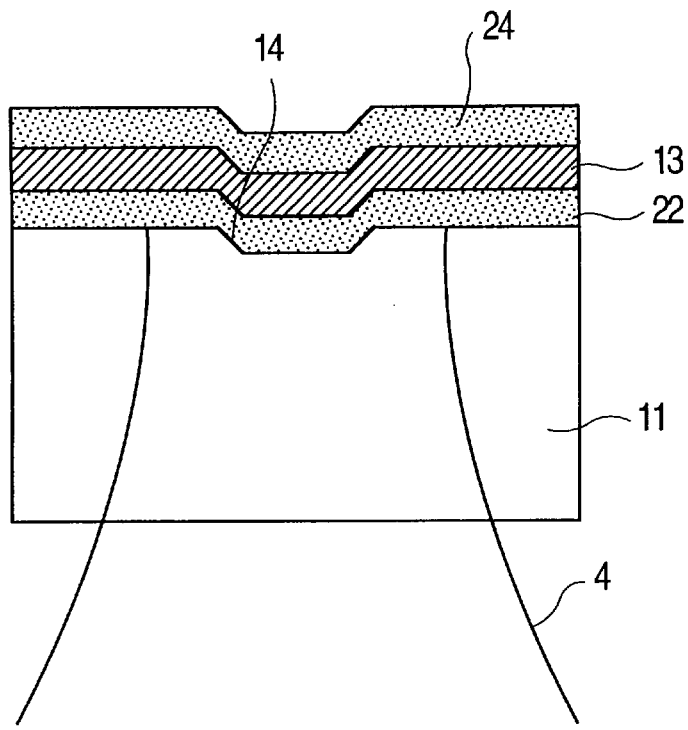
FIG. 3 is a sectional view showing the optical data recording media related to one embodiment of this invention.

For embodying the present invention practically, it is desirable to form a glue layer 22 and a protective layer 24 in such manner as both layers sandwich the recording layer 13 as shown in FIG. 3. That is, the glue layer 22 is formed on the transparent substrate 11 on which the tracking channels 14 have been formed, the recording layer 13 is formed on this glue layer 22, and the protective layer 24 is formed on the recording layer 13. The glue layer 22 and the protective layer 24 work also as an optically interfering layer which has functions to magnify the output signals and to increase the absorption coefficient in the recording layer 13 due to the interference of light. As the glue layer 22 and the protective layer 24, transparent nitrides such as $Si_3N_4$, AlN or the like, oxides such as SiO, $SiO_2$, $Ta_2O_5$ or the like, chalcogenides such as ZnS, ZnSe, MnS or the like can be used as a single or a mixed component. The thickness of each of these layers is determined based on the reflectivity and optical property of the recording layer 13. For example, the glue layer 22 can be formed in a thickness of 100 nm or more, preferably 150 to 200 nm. Also, the protective layer 24 can be formed in a thickness of 20 to 200 nm.

Figure 4:
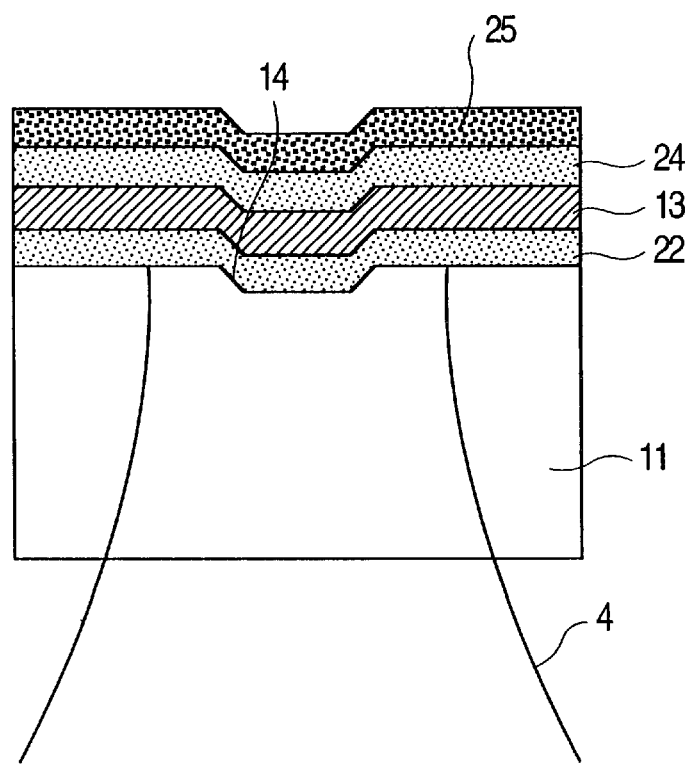
FIG. 4 is a sectional view showing the optical data recording media related to another embodiment of this invention.

Also, a reflective layer 25 can be formed on the protective layer 24 as shown in FIG. 4 to intensify the optical interference and to increase cooling efficiency of the media (the recording layer 13). As the reflective layer 25, metals such as Al, Au, Ti, Cr, Mo, W, Ta or the like can be used as a single component or in combination with various additives or as an alloy of said metals in order to control the reflectivity and the heat diffosivity as well as to improve the adhesion of each layer. Also, as the reflective layer 25, a semiconductor having a high reflective index such as Ge, Si and the like can be used. The thickness of the reflective layer 25 is preferable to be 10 to 300 nm.

Now, examples of this invention will be described further in detail. By the sputtering method, ZnS-20 atomic % of $SiO_2$ layer of 210 nm, $Ge_1Sb_4Te_7$ layer of 20 nm, ZnS-20 atomic % of $SiO_2$ layer of 20 nm and Al layer of 60 nm were sequentially formed on a poly-carbonate substrate with a diameter of 130 mm and a thickness of 1.2 mm, having tracking grooves. Furthermore, UV light coring resin layer of 9.2 um thickness was formed on this Al layer. Using this disk, the following experiment was conducted.

The disk is being rotated at the speed of 22.6 m/second. The optical head used for recording, erasing and reading data was set at as follows: the wavelength at 820 nm, NA nomerical (aperture) at 0.55, the beam diameter at 1.5 $\mu$m in the direction parallel to the tracking grooves and 1.3 $\mu$m in the direction perpendicular to the tracking grooves. The erasing power was kept at the constant of 1 mW. Before recording data, characteristics of the recording layer was changed, by the irradiation of the laser beam onto whole surface of the recording layer, from the amorphous state to the crystallized state.

Measurements of overwriting characteristics were performed by measuring the signal/noise ratio at the signal of 8.37 MHz and the erase ratio of the signal of 2.12 MHz after overwriting was made at 8.37 MHz over the recording layer already recorded at 2.12 MHz, and followed by measuring the signal/noise ratio at the signal of 2.12 MHz and the erase ratio of the signal at 8.37 MHz after overwriting was made at 2.12 MHz.

Figure 1:
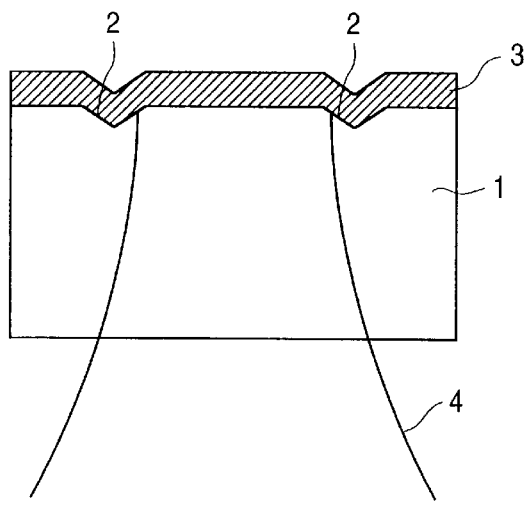
FIG. 1 is a sectional view showing the basic structure of the conventional optical data recording media.
Figure 5:
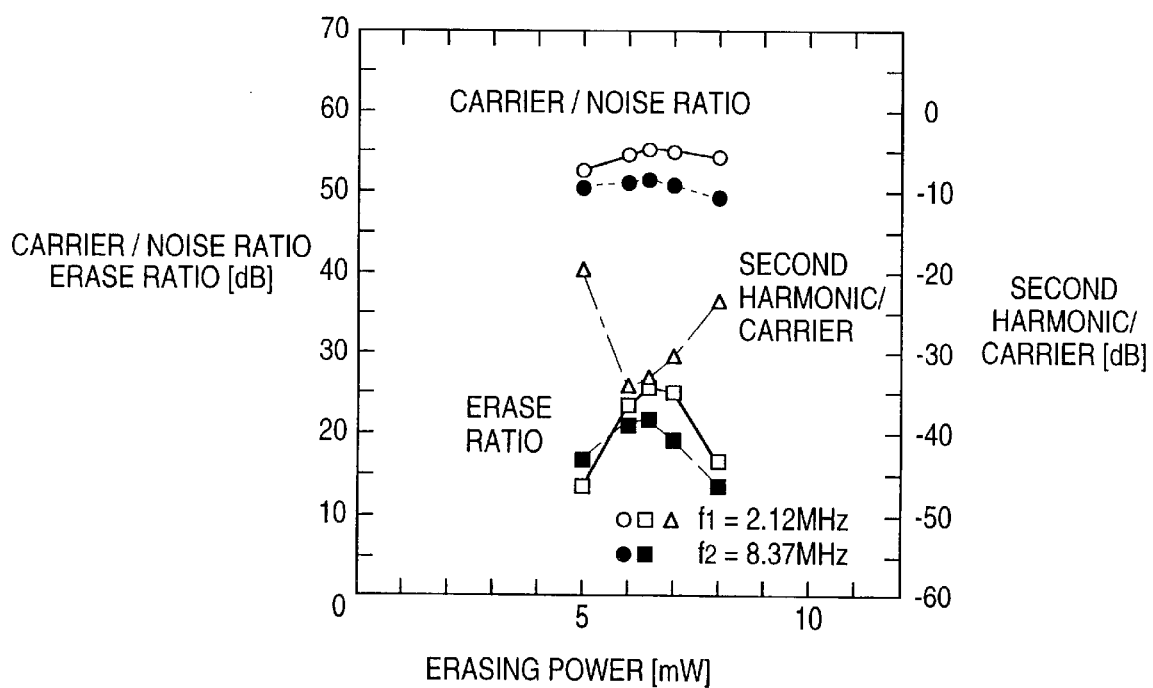
FIG. 5 is a graph showing the overwriting characteristics of the conventional optical data recording media.

First as an example of the conventional disk, the erasing power dependency of overwriting characteristics for the substrate having the width of extruded region at 1.1 $\mu$m and the V-shaped grooves with the pitch of grooves at 1.6 $\mu$m is shown in FIG. 5. The recording power used was 12 mW. At the erasing power of 6.5 mW, the erase ratio in case of overwriting at 2.12 MHz was −25.4 dB, however the erasing efficiency in case of overwriting at 8.37 MHz was −21.5 dB and lower by 4.1 dB compared to the overwriting at 2.12 MHz. Observations of the overwritten recording layer by transmission electron microscope indicated that the width of recording mark formed at 2.12 MHz was 0.85 $\mu$m, while the width of recording mark formed at 8.37 MHz was 0.65 $\mu$m and the recording mark at 2.12 MHz was broader than that at 8.37 MHz.

Figure 6:
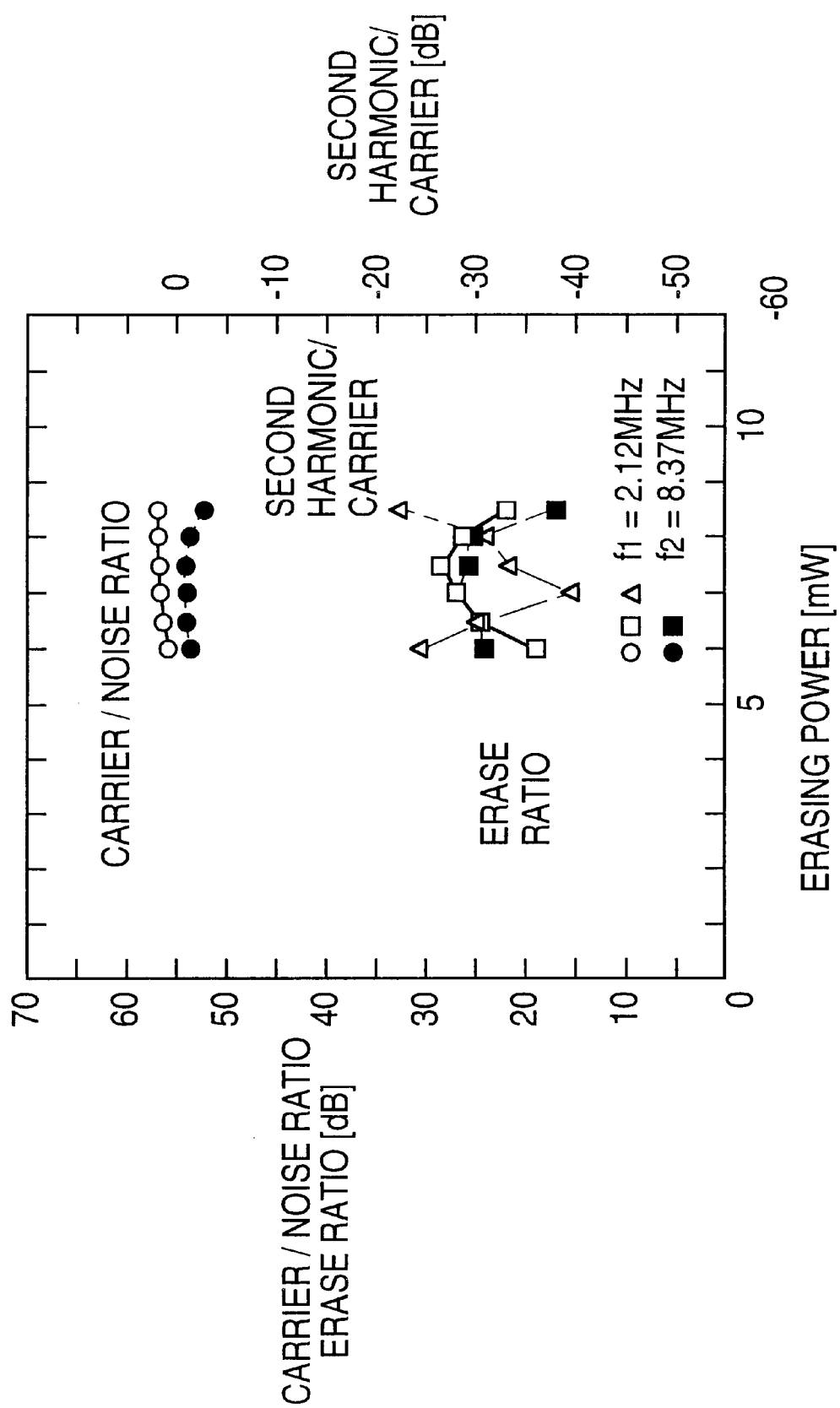
FIG. 6 is a graph showing the overwriting characteristics of the optical data recording media of this invention.

Then, as an example of the present invention, in case the substrate having the width of extruded region between the tracking grooves at 0.65 $\mu$m, the width of concave region at 0.60 $\mu$m and the pitch of grooves at 1.6 $\mu$m was used as one of embodiment of this invention, the erasing power dependency on the overwriting characteristics was determined and the results are shown in FIG. 6. The recording power was 14 mW. Recording was made to the concave area of substrate. The erasing efficiency was −26.8 dB in both cases at 2.12 MHz and 8.37 MHz, and the result indicated that the recording frequency-dependency on the erasing efficiency was very low.

The overwriting characteristics were measured using various substrates in which the width of concave region is varied and the pitch of tracking grooves is fixed at 1.6 μm. Results indicated that good erasing characteristics with small recording frequency-dependency can be obtained in case the width of concave region of the tracking channels was within the range from 0.5 to 0.8 μm. Using these samples, the area of recording layer overwritten was observed by transmission electron microscope. Results indicated that the width of recording mark formed at 2.12 MHz was almost equal to that of recording mark formed at 8.37 MHz. This results from the fact that the recording marks were formed only within the concave region of the tracking channels. It is interpreted that the recording frequency-independence on the recording mark results in such smaller frequency-dependency on the erase ratio. Also, even though the width of concave region of the tracking grooves is made narrower to about 0.5 μm, the recording marks have never been recorded on outside of the concave region of the channels.

Also, in case the substrate having the width of extruded region between grooves at 0.7 μm and V-shaped channel for which the pitch is 1.2 μm, similar effects could be obtained.

In the embodiment, good and smaller recording frequency-dependent erasing characteristics could be obtained in case the width of the concave of the tracking groove is within the range from 0.5 μm to 0.8 μm when the laser beam having the diameter of 1.3 μm in the direction perpendicular to the tracking channel was irradiated. Now, the width of the extruded region or the concave region, which provides good erasing characteristics, is depending on the diameter of the laser beam, therefore the effect of this invention can be obtained when the ratio of the width of extruded or concave region to the diameter of the laser beam is within 38 to 62%. Therefore, in a case where the diameter of the laser beam becomes smaller by using a short wave length beam, the effect of this invention can be obtained by adjusting the width of the extruded or concave region of the substrate to a narrower width according to the diameter of the laser beam.

What is claimed is:

1. An optical data recording apparatus having an erase ratio substantially independent of a recording frequency, comprising:

a laser beam of a predetermined diameter for recording or erasing data at a plurality of recording frequencies; and an optical data recording media being irradiated by said laser beam, said optical data recording media including, a transparent substrate having tracking grooves forming a region, said region having a width sufficiently narrower than said predetermined diameter of said laser beam and being irradiated by said laser beam, such that a high erase ratio is provided substantially independent of said recording frequency, and a recording layer provided on the transparent substrate, said recording layer changing its optical characteristics according to an operation of heating by irradiation by said laser beam and cooling, said data being recorded by irradiation by said laser beam to said region.

2. An optical data recording apparatus as recited in claim 1, wherein said region formed by said tracking grooves is an extruded region.

3. An optical data recording apparatus as recited in claim 1, wherein said region formed by said tracking grooves is a concave region.

4. An optical data recording apparatus as recited in claim 1 wherein said width of said region is between 38% and 62% of the diameter of said laser beam.

5. An optical data recording apparatus as recited in claim 1, wherein said recording layer has a thickness of between 10 nanometers and 100 nanometers.

6. An optical data recording apparatus as recited in claim 1, further comprising:

a glue layer provided between said transparent substrate and said recording layer; and a protective layer provided on said recording layer, wherein said glue layer and said protective layer act as an optically interfering layer to increase an absorption coefficient in said recording layer due to interference of light.

7. An optical data recording apparatus as recited in claim 6, wherein said glue layer has a thickness of between 150 nanometers and 200 nanometers, and wherein said protective layer has a thickness of between 20 nanometers and 200 nanometers.

8. An optical data recording apparatus as recited in claim 6, further comprising:

a reflective layer provided on said protective layer, wherein said reflective layer intensifies an optical interference capability of said optical data recording apparatus to improve cooling efficiencies of said optical data recording apparatus.

9. An optical data recording apparatus as recited in claim 1, wherein said laser beam is centered at a substantially central portion with respect to the width of said region.

* * * * *